(12) United States Patent
Ukis

(10) Patent No.: US 9,015,298 B2
(45) Date of Patent: Apr. 21, 2015

(54) DATA PROCESSING NETWORK AND METHOD FOR OPERATING SUCH

(75) Inventor: Vladyslav Ukis, Nuremberg (DE)

(73) Assignee: Siemens Aktiengesellschaft, Munich (DE)

(*) Notice: Subject to any disclaimer, the term of this patent is extended or adjusted under 35 U.S.C. 154(b) by 1972 days.

(21) Appl. No.: 11/142,313

(22) Filed: Jun. 2, 2005

(65) Prior Publication Data

US 2005/0270990 A1 Dec. 8, 2005

(30) Foreign Application Priority Data

Jun. 3, 2004 (DE) .......................... 10 2004 027 157

(51) Int. Cl.
*G06F 15/173* (2006.01)
*H04L 29/08* (2006.01)

(52) U.S. Cl.
CPC .................................... *H04L 67/306* (2013.01)

(58) Field of Classification Search
USPC ....... 709/223, 203; 370/254–258; 707/103 X, 707/103 R, 610, 611, 612
See application file for complete search history.

(56) References Cited

U.S. PATENT DOCUMENTS

| | | | | |
|---|---|---|---|---|
| 5,181,162 A * | 1/1993 | Smith et al. | .................... | 715/209 |
| 5,806,078 A * | 9/1998 | Hug et al. | ...................... | 715/205 |
| 5,956,730 A * | 9/1999 | Burroughs et al. | ................... | 1/1 |
| 5,970,496 A * | 10/1999 | Katzenberger | ................ | 707/102 |
| 6,308,178 B1 * | 10/2001 | Chang et al. | .................. | 707/100 |
| 6,317,748 B1 * | 11/2001 | Menzies et al. | ........... | 707/103 X |
| 6,324,578 B1 * | 11/2001 | Cox et al. | ....................... | 709/223 |
| 6,381,620 B1 * | 4/2002 | Matsuura et al. | .............. | 715/203 |
| 6,389,464 B1 * | 5/2002 | Krishnamurthy et al. | .... | 709/220 |
| 6,393,486 B1 * | 5/2002 | Pelavin et al. | ................. | 709/238 |
| 6,401,101 B1 * | 6/2002 | Britton et al. | .......................... | 1/1 |
| 6,718,352 B1 * | 4/2004 | Dang et al. | ..................... | 707/205 |
| 6,978,260 B2 * | 12/2005 | Hack | ..................................... | 1/1 |
| 7,089,259 B1 * | 8/2006 | Kouznetsov et al. | .......... | 707/102 |
| 7,457,817 B2 * | 11/2008 | Krishnaswamy et al. | ............. | 1/1 |
| 2002/0198969 A1 * | 12/2002 | Engel et al. | ................... | 709/220 |
| 2003/0182403 A1 | 9/2003 | de Bonet | | |
| 2003/0200223 A1 * | 10/2003 | Hack | ............................. | 707/101 |

(Continued)

FOREIGN PATENT DOCUMENTS

| | | |
|---|---|---|
| DE | 10350049 A1 | 5/2004 |
| WO | WO 2004/001589 A2 | 12/2003 |

OTHER PUBLICATIONS

Alan Snyder; Encapsulation and Inheritance in Object-Oriented Programming Languages; ACM; 1986.*

(Continued)

Primary Examiner — Jimmy H Tran
(74) Attorney, Agent, or Firm — Harness, Dickey & Pierce, P.L.C.

(57) ABSTRACT

To reduce the administration complexity required for a data processing (DP) network, provided particularly for use in the medical or clinical sector, a method is proposed which specifies a DP network which is advantageous in this respect and also an associated method of operation. The DP network includes a configuration server and also at least one further data processing appliance, on which an application, configured using prescribed configuration data, is installed. In this case, the configuration data are stored on the configuration server and are made available to the at least one DP appliance for the purpose of configuring the application (A).

17 Claims, 2 Drawing Sheets

(56) References Cited

U.S. PATENT DOCUMENTS

| | | | |
|---|---|---|---|
| 2004/0044689 A1* | 3/2004 | Krabel et al. | 707/104.1 |
| 2004/0081104 A1 | 4/2004 | Pan et al. | |
| 2005/0131870 A1* | 6/2005 | Krishnaswamy et al. | 707/3 |
| 2005/0223374 A1* | 10/2005 | Wishart et al. | 717/173 |

OTHER PUBLICATIONS

German Office Action Issued Aug. 5, 2004.

* cited by examiner

DATA PROCESSING NETWORK AND METHOD FOR OPERATING SUCH

The present application hereby claims priority under 35 U.S.C. §119 on German patent application number DE 10 2004 027 157.7 filed Jun. 3, 2004, the entire contents of which is hereby incorporated herein by reference.

FIELD

The invention generally relates to a data processing network. The invention also generally relates to a method geared to operating such a data processing network. The inventive data processing network and the associated method of operation of an example embodiment may be intended, particularly, for use in the medical or clinical sector.

BACKGROUND

A data processing (DP) network generally includes a plurality of data processing (DP) appliances which are networked to one another for the purpose of data transmission, i.e. computers or other computer-aided and networkable appliances. In this context, a DP network usually contains at least one server which distributes data to a multiplicity of terminals.

A DP network used in the medical sector, as is in use in a modern clinic, for example, incorporates as DP appliances particularly a multiplicity of examination appliances, e.g. computer tomographs etc. It further also typically incorporates a large number of workstations for editing and examining the examination data. A DP network also generally includes a number of input and output appliances, e.g. printers, scanners etc.

Each DP appliance in a DP network normally has a multiplicity of applications, i.e. software modules, installed on it. Usually, such an application can and must be configured by prescribing particular configuration data. Such configuration data define a memory path, for example, under which the application stores data or from which it obtains data. In addition, the configuration data associated with an application usually comprise standard settings for the application's user interface etc.

These configuration data are normally combined in one or more configuration files which are stored locally on the DP appliance. Frequently, a DP appliance also holds a plurality of configuration files associated with the same application, each of these files being associated with a different user. The total quantity of the configuration data associated with the user is also called the user profile.

Some of the configuration data are specific to one specific application or one particular DP appliance. Other configuration data are specific to a group of applications or DP appliances. Yet other configuration data are universal, i.e. are valid for all applications and all DP appliances in the DP network. These configuration data include the IP addresses of network printers, for example.

The complexity and nonuniformity of a DP network used on average in a modern clinic mean that administrating it requires considerable effort. One particular reason for this is that applications of the same type are frequently available in different software versions on the various DP appliances, or from time to time even on one and the same DP appliance. To make a desired configuration change throughout the network, this change normally needs to be made a multiplicity of times in the individual configuration files on the affected DP appliances.

As an alternative to local storage of the configuration data, it is known practice, for example from US 2003/0182403 A1, to provide configuration data outside of the DP appliance in one or more external configuration sources.

SUMMARY

An embodiment of the invention includes an object of specifying a DP network which allows simplified administration. An embodiment of the invention also includes an object of specifying a method for operating a DP network which achieves, for example, particularly low administration complexity.

Accordingly, the DP network of at least one embodiment includes a configuration server and at least one, but preferably a multiplicity of, further DP appliances, with the or each DP appliance having at least one application configured using prescribed configuration data installed on it. In this case, the configuration data required for configuring the or each application may be stored centrally on the configuration server and are made available from there for the purpose of configuring the or each application.

In the case of central storage of the configuration data in a configuration server, the administration of a DP network is considerably simplified merely insofar as the entire DP network can be administrated from a central location. To configure the network, the administration personnel therefore need to visit neither the physical location of each DP appliance which is to be configured nor its position in the generally very complex logical infrastructure of the DP network on an individual basis.

Rather, the central storage of the configuration data means that the clarity thereof is significantly improved. Further, redundancy thereof is significantly reduced, which considerably reduces the risk of error and the administration complexity.

In at least one example embodiment, configuration data may be changed or added exclusively via the configuration server, e.g. by virtue of a DP appliance which needs to be reconfigured sending an appropriate request to the configuration server. The change to the configuration data is then made on the configuration server. In this case, the configuration server expediently notifies at least the DP appliances which are affected by the change.

At least one example embodiment of the invention ensures particularly effective management of the configuration data by the configuration server by virtue of the configuration data being stored in a relational database with a normalized scheme. In this case, the configuration data are expediently typified, i.e. divided into data types and data instances associated therewith. A data type more or less depicts an organization scheme for configuration data by virtue of each data type defining a number of data elements. By contrast, each data instance represents a form of the organization scheme depicted by the associated data type by virtue of each data instance allocating a value to each data element of the associated data type.

Expediently, data types are stored on an application-specific basis, in one particular embodiment. That is to say that a data type combines with data elements which are required for configuring a particular application.

Alternatively or in addition, provision may be made for data types to be organized on an appliance-specific basis. In this context, a data type combines data elements which are required for configuring applications on a particular DP appliance. In at least one embodiment, the configuration server contains data types which are organized both on an application-specific basis and on an appliance-specific basis. Such a data type thus defines the data elements which are required for configuring a particular application on a particular DP appliance.

To be able to handle different versions of a common application type in simplified fashion, in particular, provision may also be made for a data type to be able to be marked as dependent on a further data type, the consequence of this marking being that mutually corresponding data instances are "synchronized" by data types which are dependent on one another. The synchronization of two such data instances is understood to mean that mutually corresponding data elements of the respective data types are always allocated the same value by the synchronized data instances. In particular, a data instance "corresponds" to a further data instance (or a data element corresponds to a further data element) if the two data instances (or data elements) have the same name.

The effect achieved by the option of defining dependent data types is that the installation and configuration of an application which is based on an already existing earlier version of the same application type does not necessitate reinput of all associated configuration data. Rather, only the changes in the configuration data over the previous version need to be input. Common configuration data are simply adopted by identifying a dependency on a data type which corresponds to the previous version.

On the basis of the synchronization control described above, this allows flexible reference to be made to already existing configuration data. Thus, when defining a new, dependent data type, it is possible both to add new data elements and to omit existing data elements of the data type referenced in the dependency in a targeted fashion.

To enable or even ensure a particularly short access time to required configuration data by each DP appliance, provision may be advantageously made for a copy of the configuration data made available to the DP appliance by the configuration server to be buffer-stored locally in a cache memory in the DP appliance. This copy is deactivated or renewed whenever there is a change in the configuration data in question.

In at least one example embodiment, the configuration server stores both universal configuration data and application-specific and/or appliance-specific and/or user-specific configuration data.

BRIEF DESCRIPTION OF THE DRAWINGS

An example embodiment of the invention is explained in more detail below with reference to the drawings, in which.

Mutually corresponding parts and variables have always been provided with the same reference symbols in all figures.

DETAILED DESCRIPTION OF THE EXAMPLE EMBODIMENTS

Figure 1:
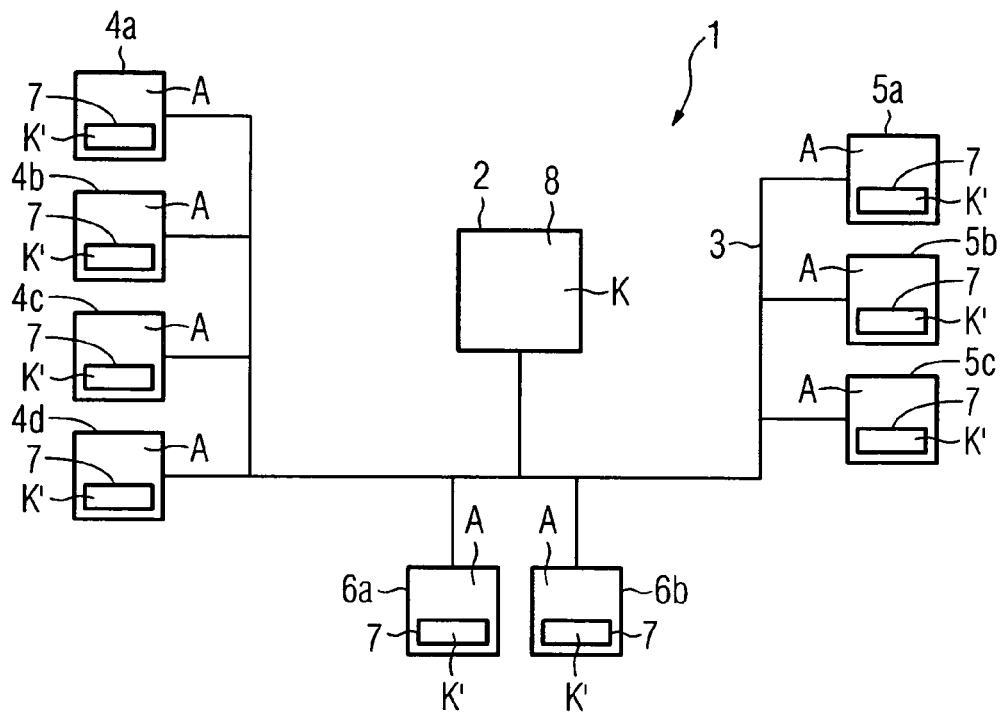
FIG. 1 shows a schematic block diagram of a data processing (DP) network having a configuration server and a plurality of further data processing (DP) appliances.

FIG. 1 shows a simplified data processing (DP) network 1, which may be, in at least one embodiment, provided for use in a clinic. The DP network 1 includes a central configuration server 2 which is connected via a data transmission network 3 to a number of further data processing (DP) appliances, i.e. computers or other computer-aided appliances. The DP appliances include workstations 4a to 4d, i.e. computers, which are used, in particular, for editing and examining examination data, examination stations 5a to 5c, i.e. computer-aided examination appliances such as a computed tomograph etc., and also input/output appliances 6a, 6b such as a printer or a scanner.

On each or at least a plurality of the DP appliances 4a-4d, 5a-5c, 6a, 6b, a number of applications A, i.e. software modules, are installed. Such applications A include, by way of example, control programs for an examination appliance, image editing programs, examination and diagnosis programs and word processing programs.

Each or at least a multiplicity of these applications A can and must be configured by prescribed configuration data K. In this context, these configuration data K are stored centrally in the configuration server 2 and are made available from there to the individual DP appliances 4a-4d, 5a-5c 6a, 6b.

The configuration data K stored on the configuration server 2 firstly include universal data which are relevant for a multiplicity of applications A and for a multiplicity of DP appliances 4a-4d, 5a-5c, 6a, 6b, particularly the IP addresses of the available network printers. The configuration data K also include application-specific data, for example system settings for an application A which are the same throughout the network and appliance-specific data, e.g. the name and IP address of a workstation 4a-4d. The configuration data K also include, in particular, data which are both application-specific and appliance-specific, e.g. a local memory path for a particular application A on a particular workstation 4a-4d.

The configuration server 2 also stores user-specific data, particularly user names and passwords for the users, and display options which have been set on a user-specific basis (user profiles). In particular, any information required for configuring applications A on one of the DP appliances 4a-4d, 5a-5c, 6a, 6b is thus stored centrally in the configuration server 2.

To ensure rapid access to the required configuration data K by each individual DP appliance 4a-4d, 5a-5c, 6a, 6b, a cache memory 7 in the respective DP appliance 4a-4d, 5a-5c, 6a, 6b buffer-stores a copy K' of a respective relevant extract from the configuration data K stored in the configuration server 2.

A change in configuration data K, e.g. in the course of reinstallation of an application A or in the course of reconfiguration of an existing application A, is permissible exclusively via the configuration server 2. In this context, the configuration data K are changed upon appropriate request from a DP appliance 4a-4d, 5a-5c, 6a, 6b to the configuration server 2. The latter makes the desired change and notifies the DP appliances 4a-4d, 5a-5c, 6a, 6b affected by the change, which in turn deactivate the buffer-stored copy K' and, if required, request an updated copy K' from the configuration server 2. This enables, or even ensures, that a change made in respect of a particular DP appliance 4a-4d, 5a-5c, 6a, 6b simultaneously takes effect on all affected further DP appliances 4a-4d, 5a-5c, 6a, 6b and that each DP appliance 4a-4d, 5a-5c, 6a, 6b always has access to an up-to-date set of configuration data K at any time.

Figure 2:
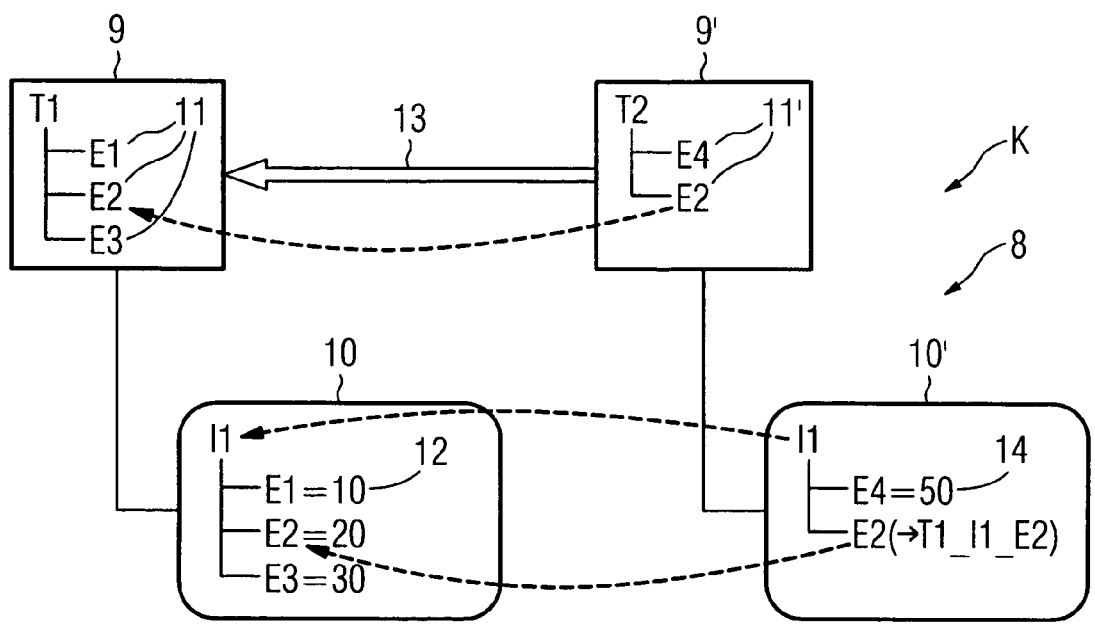
FIG. 2 shows a schematic diagram of a configuration data structure stored on the configuration server with two data types and a respective data instance associated with each data type.

The configuration data K are held in a relational database 8 with a normalized scheme in the configuration server 2. The structure of this database 8 is shown diagrammatically and in the form of details in FIG. 2. The database 8 is typified, i.e. the configuration data K are divided into a number of data types 9 and data instances 10 associated therewith. FIG. 2 shows two data types 9, 9' by way of example with the labels "T1" and "T2", each of which has an associated data instance 10, 10' with the label "I1".

Each data type 9, 9' defines a number of data elements 11, 11'. The data type 9 ("T1") defines data elements 11 with the labels "E1", "E2" and "E3", for example, and the data type 9' ("T2") accordingly defines data elements 11' with the labels "E4" and "E2". The data instance 10 or 10' associated with a data type 9, 9' fills each data element 11 or 11' of this data type 9, 9' with a value 12. By way of example, the data instance 10 ("I1") associated with the data instance 9 ("T1") allocates the data elements "E1" the value "10" etc.

Particularly in order to be able to configure different versions of the same application type in rational fashion, a data type 9' can be allocated a dependency 13 on a further data type 9. FIG. 2 corresponds particularly to the case in which the data types 9, 9' ("T1" and "T2") correspond to an old version or a new version of the same application type.

The effect achieved by the synchronization method described below is that data for several types, particularly for several versions, are always aligned with one another in all affected data types 9, 9'. Each data element 11' of a data type 9' which has an associated dependency 13 on a further data type 9 is synchronized if the data element 11' has a corresponding (i.e. one of the same name, indicated in FIG. 2 by a dashed line between data elements E2) data element 11 of the data type 9. The data element 11' is synchronized in each data instance 10' associated with the data type 9' if this data instance 10' has a corresponding (i.e. one of the same name, indicated in FIG. 2 by a dashed line between data instances 10 ("I1") and 10' ("I1")) data instance 10 of the data type 9, by virtue of the data element 11' which is to be synchronized in the data instance 10' always being allocated the value 12, which the corresponding data element 11 has in the corresponding data instance 10 of data type 9.

In the clear example shown in FIG. 2, both data types "T1" and "T2" have a data element "E2" of the same name and a data instance "I1" of the same name. In line with the aforementioned synchronization rules, the data element "E2" of data type "T2" in the data instance "I1" is thus allocated the value of the data elements "E2" of the data type "T1" in the data instance "I1".

The allocation is expediently made in FIG. 2 in the form of a reference 14. In this case the character sequence "→T1_E2_I1" used in FIG. 2 symbolizes a reference to the value of the element "E2" of the data type "T1" in the data instance "I1". In other words, the reference 14 always achieves the alignment "T1_E2_I1"="T2_E2_I1". If this value is changed in one of the data instances 10 or 10', then it changes simultaneously for both linked data elements 11, 11'.

To be able to make configuration changes within the DP network 1 in uncomplex fashion, provision is made for the database 8 installed in the configuration server 2 to be able to be used to produce both data types 9, 9' and data instances 10, 10' during the execution time. To produce data types 9, 9' the database 8 shown in FIG. 3 comprises a type generation module 15. To instantiate the data types 9, 9' produced by this type generation module 15, the database 8 also comprises an instance generation module 16. A downstream appliance application management module (subsequently called GAM module 17 for short) allocates a data instance 10, 10' produced in this way to a DP appliance 4a-4d, 5a-5c, 6a, 6b. The GAM module 17 particularly makes it possible to define which application A, particularly which version of an application type, is installed on the respective DP appliance 4a-4d, 5a-5c, 6a, 6b.

To configure user settings, the database 8 also comprises a user management module 18 which can be used to create user profiles. For the purpose of user-specific configuration of display options, the user management module 18 resorts to a GUI (Graphical User Interface) Module 19. The GUI module 19 provides graphical user elements such as buttons, drop-down boxes etc. for creating a graphical user interface.

Figure 3:
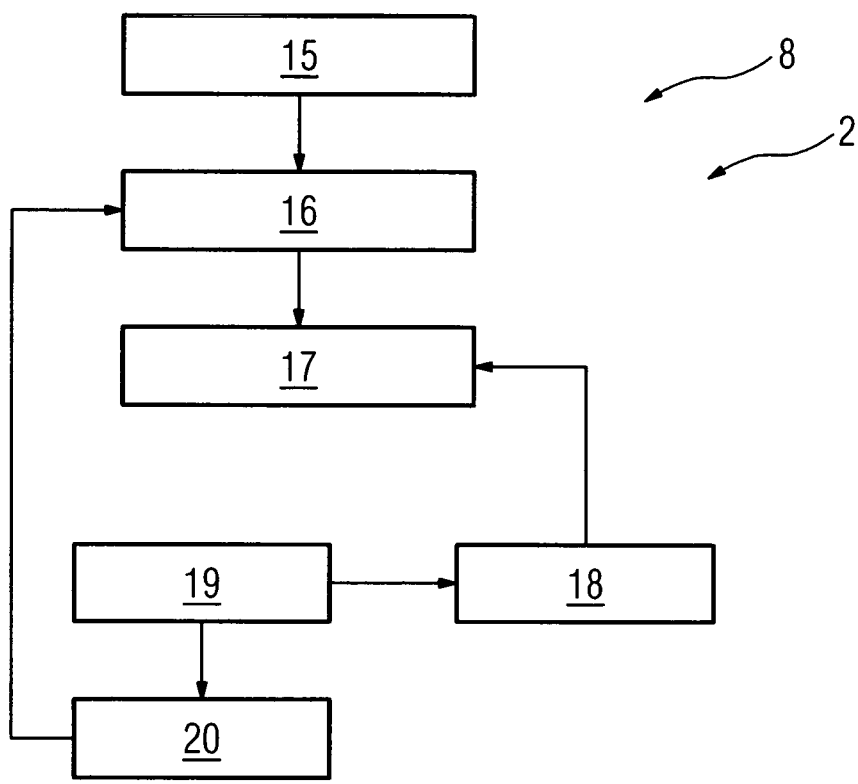
FIG. 3 shows a schematic block diagram of an organization scheme for the configuration server.

To this end, the GUI module 19 cooperates with an NLS module 20, which can be used to create inscriptions for the graphical user elements provided by the GUI module 19. These inscriptions are stored in different languages, with the NLS module 20 respectively using the inscription which corresponds to the language selected on a user-specific basis. Such an inscription is either indicated in plain text or—as shown in FIG. 3—is supplied to the instance generation module 16. In the latter case, the inscription on a control element represents an element value for a data instance.

The user profiles produced by the user management module 18 include a user-specific selection of graphical user elements which are stored in the GAM module 17 for several appliances but on an application-specific basis, so that the same user profile is available throughout the network.

The particular effect achieved by the DP network 1 described above and the method for using it is that the configuration data K are available throughout the network. The doctors using the DP network 1 are therefore able to select any workstation 4a to 4d from a pool of examination workstations for the purposes of examination, for example. Changes to a user profile can be made either by a user from the local workstation, e.g. directly in the application, or centrally by a network administrator in the clinic.

In addition, it is a simple matter to manage the configuration data for an application type available in different versions jointly. When a new version is added, the old presets are transferred as far as possible without the need for the old configuration data to be input again. In this case, the configuration complexity required is limited to the input of the parameters added in the new version. When adding a new workstation 4a to 4d or examination station 5a to 5c, there is no associated additional configuration complexity, provided that no new application is to be installed along with the new appliance. The DP appliance 4a-4d, 5a-5c in question is configured automatically by the configuration server 2.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A data processing (DP) network, comprising:
a configuration server; and
at least one DP appliance, wherein
    a relational database having configuration data is stored on the configuration server,
    at least one application is installed on the DP appliance,
    the configuration data configures the installed application,
    the configuration data includes at least two data types and at least one data instance per data type, each data instance being associated with the respective data type as an instance of the data type to which the data instance is associated,
    each data type has a label and contains definitions of a plurality of data elements, each data element of the plurality of data elements having a label, each data instance has a label and allocates a respective value to each of the plurality of data elements defined in the associated data type, a first data type of the at least two data types is dependent on a second data type of the at least two data types, and an instance of the first data type and an instance of the second data type always allocate a same value to a data element of the plurality of data elements of the first data type and a data element of the plurality of data elements of the second data type, respectively, when said instance of the first data type and said instance of the second data type have a same label and when said first and second elements have a same label.

2. The DP network of claim 1, wherein at least one data type of the at least two data types is associated with the at least one DP appliance.

3. The DP network of claim 1, wherein the configuration data stored on the configuration server includes at least one of universal data, application-specific data, appliance-specific data and user-specific data.

4. A method of operating a data processing (DP) network including a configuration sever and at least one DP appliance, the method comprising:

installing at least one application on the at least one DP appliance;

storing a relational database having configuration data on the configuration server, the configuration data configuring the installed at least one application and the configuration data including at least two data types and at least one data instance per data type, each data instance being associated with the respective data type as an instance of the data type to which the data instance is associated;

labeling each data type and defining a plurality of data elements contained in each data type;

labeling each data element of the plurality of data elements;

labeling each data type and allocating a respective value to each of the plurality of data elements defined in the associated data type, wherein a first data type of the at least two data types is dependent on a second data type of the at least two data types, and an instance of the first data type and an instance of the second data type always allocate a same value to a data element of the plurality of data elements of the first data type and a data element of the plurality of data elements of the second data type, respectively, when said instance of the first data type and said instance of the second data type have a same label and when said first and second elements have a same label.

5. The method as claimed in claim 4, further comprising: indicating a change in the configuration data to each affected DP appliance using the configuration server.

6. The method as claimed in claim 4, further comprising: defining the plurality of data elements contained in each data type for configuring a particular application.

7. The method as claimed in claim 4, further comprising: defining the plurality of data elements required for configuring the at least one installed application of a prescribed DP appliance.

8. The method as claimed in claim 4, further comprising: storing a copy of the configuration data made available to the DP appliance by the configuration server in a local cache memory in the at least one DP appliance.

9. The method as claimed in claim 7, further comprising: storing and providing user-specific data using the configuration server.

10. The DP network of claim 2, wherein the configuration data stored on the configuration server includes at least one of universal data, application-specific data, appliance-specific data and user-specific data.

11. The method as claimed in claim 5, further comprising: defining the plurality of data elements contained in each data type for configuring a particular application.

12. The method as claimed in claim 5, further comprising: defining the plurality of data elements required for configuring the at least one installed application of a prescribed DP appliance.

13. The method as claimed in claim 6, further comprising: defining the plurality of data elements required for configuring the at least one installed application of a prescribed DP appliance.

14. The method as claimed in claim 5, further comprising: storing a copy of the configuration data made available to the DP appliance by the configuration server in a local cache memory in the at least one DP appliance.

15. The method as claimed in claim 5, further comprising: storing and providing user-specific data using the configuration server.

16. The method as claimed in claim 6, further comprising: storing a copy of the configuration data made available to the DP appliance by the configuration server in a local cache memory in the at least one DP appliance.

17. The method as claimed in claim 6, further comprising: storing and providing user-specific data using the configuration server.

* * * * *